(12) United States Patent
Chung et al.

(10) Patent No.: US 8,662,237 B2
(45) Date of Patent: Mar. 4, 2014

(54) EXTERNAL AIRBAG STRUCTURE OF VEHICLE

(75) Inventors: Tae Wook Chung, Seoul (KR); Yong Sun Kim, Namyangju-si (KR); Seoung Hoon Lee, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/550,219

(22) Filed: Jul. 16, 2012

(65) Prior Publication Data

US 2013/0140102 A1 Jun. 6, 2013

(30) Foreign Application Priority Data

Dec. 6, 2011 (KR) .......................... 10-2011-0129421

(51) Int. Cl.
*B60R 21/36* (2011.01)
*B60R 21/239* (2006.01)

(52) U.S. Cl.
USPC .......................................... 180/274; 280/739

(58) Field of Classification Search
USPC .................... 280/739, 730.1; 180/274, 271
See application file for complete search history.

(56) References Cited

U.S. PATENT DOCUMENTS

| | | | |
|---|---|---|---|
| 3,708,194 A * | 1/1973 | Amit | 293/1 |
| 5,478,111 A * | 12/1995 | Marchant et al. | 280/739 |
| 5,518,269 A * | 5/1996 | Storey et al. | 280/739 |
| 5,646,613 A * | 7/1997 | Cho | 340/903 |
| 5,718,447 A * | 2/1998 | Rose et al. | 280/728.2 |
| 5,959,552 A * | 9/1999 | Cho | 340/903 |
| 6,923,483 B2 * | 8/2005 | Curry et al. | 293/107 |
| 7,211,752 B2 * | 5/2007 | Okamoto et | 200/61.58 R |
| 7,232,001 B2 * | 6/2007 | Hakki et al. | 180/271 |
| 7,359,782 B2 * | 4/2008 | Breed | 701/45 |
| 7,494,151 B2 * | 2/2009 | Maripudi | 280/739 |
| 7,770,922 B2 * | 8/2010 | Schneider et al. | 280/739 |
| 7,967,098 B2 * | 6/2011 | Choi | 180/274 |
| 2002/0121770 A1* | 9/2002 | Schneider | 280/732 |
| 2005/0269805 A1* | 12/2005 | Kalliske et al. | 280/730.1 |

FOREIGN PATENT DOCUMENTS

JP 2001-315599 A 11/2001

* cited by examiner

*Primary Examiner* — Drew Brown
(74) *Attorney, Agent, or Firm* — Morgan, Lewis & Bockius LLP

(57) ABSTRACT

An external airbag structure for a vehicle includes an airbag cushion disposed to develop toward a front side of a bumper from a folded state, a vent hole formed at the airbag cushion, and a variable vent cover attached to the airbag cushion to block the vent hole, wherein the variable vent cover includes a material having a heat-resisting property which is melted and torn by a temperature and/or a pressure of an internal expansion gas of the airbag cushion on expansion of the airbag cushion. The vent hole is opened to perform an effective cushion action as the airbag cushion is developed.

4 Claims, 6 Drawing Sheets

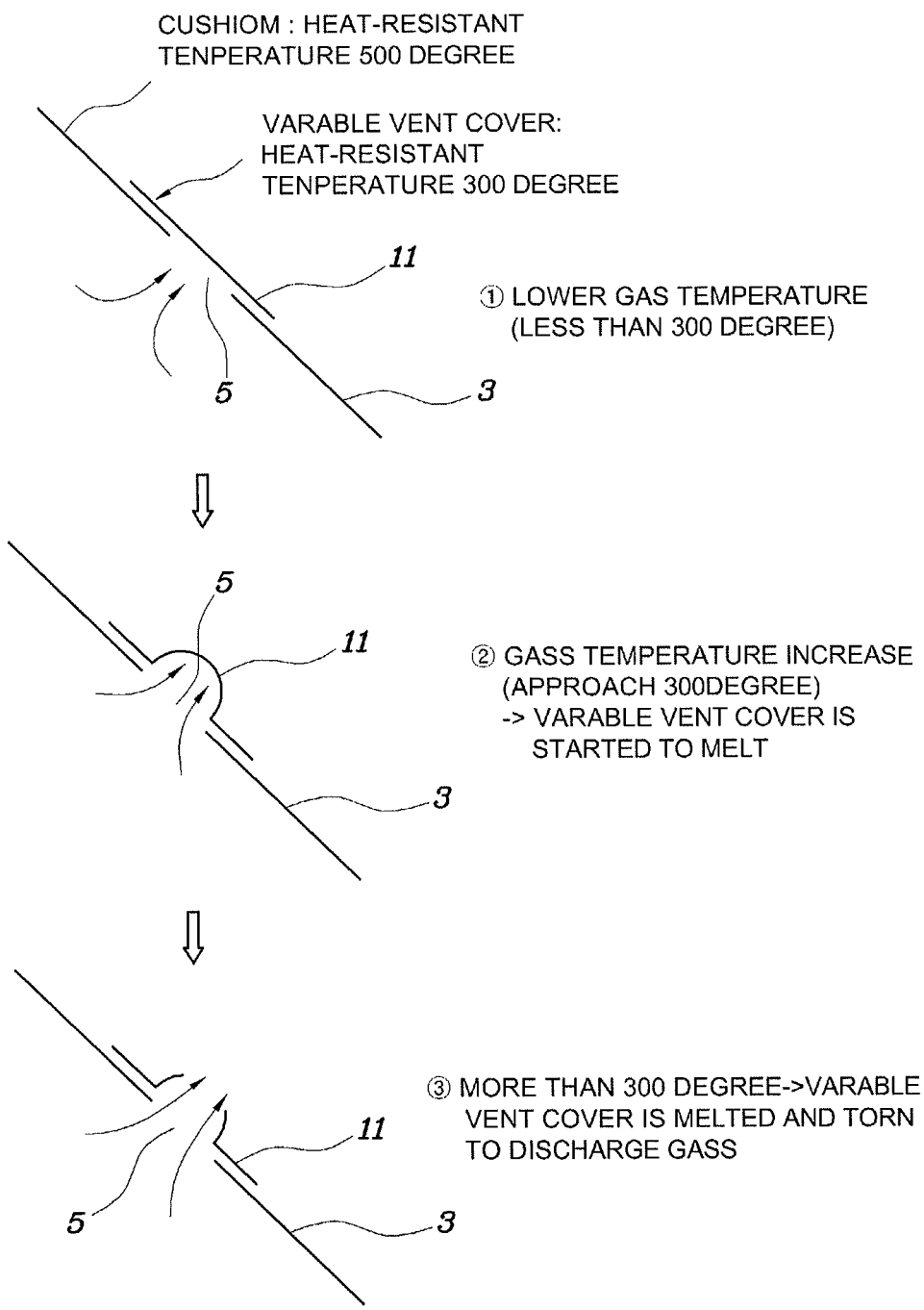

EXTERNAL AIRBAG STRUCTURE OF VEHICLE

CROSS-REFERENCE TO RELATED APPLICATION

The present application claims priority of Korean Patent Application Number Nos. 10-2011-0129421 filed on Dec. 6, 2011, the entire contents of which application are incorporated herein for all purposes by this reference.

BACKGROUND OF INVENTION

1. Field of Invention

The present invention relates to an external airbag structure of a vehicle, more particularly, to a venting structure for discharging gas of an airbag cushion.

2. Description of Related Art

As desire for an improved safety for a vehicle has increased and has become a high-quality, a concern for an exterior for the vehicle has been high. In particular, it has been proposed that an external airbag is provided at front of a front bumper so that an air bag is developed in advance before a chassis substantially collides with obstacles on a crash. Such an airbag ensures that it makes an absorbing interval of collision energy longer to reduce a collision impact applied to a passenger.

In order to perform an appropriate cushion action of the external airbag cushion as described above, such an airbag cushion should have 5 to 20 times more absorbing energy than the existing airbag cushion disposed at an indoor for protecting a passenger. To accomplishing this, it is necessary that the airbag cushion has 5 to 15 times in an energy absorption, has a about 5 to 15 times size and an inflator have a 10 to 20 times capacity compared with the existing airbag cushion. In this case, gas injected from the inflator has a high temperature that exerts an adverse effect on a person or things around a vehicle based on a discharging direction.

In addition, the inflator has a limited capacity. Therefore, since a vent hole of the airbag of the cushion is initially closed, it is preferable that the airbag cushion is made to develop as quickly as possible and is opened to discharge gas after a completion of the development of the airbag cushion to properly take a cushion effect.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present application are directed to solve the above-mentioned problems. One aspect of the present application provides an external airbag structure of a vehicle which does not have an adverse effect on a person or other things adjacent to the outside a vehicle due to discharging gas from vehicle, and make a cushion action more effective by opening a vent hole after the initial development of the air bag cushion completes to perform the cushion action.

An exemplary external airbag structure according to various aspects of the present application may include: an airbag cushion disposed in the vehicle to develop toward a front side of a bumper from a folded state, and a vent hole formed in the airbag cushion at a portion that is remained within the bumper when the airbag cushion is developed.

Another aspect of the present application is directed to provide a structure for an exemplary external airbag vehicle including an airbag cushion disposed in the vehicle to develop toward a front side of a bumper from a folded state, and a vent hole opened toward a rear side of a vehicle in a rear inclined surface of the airbag cushion directing to the rear side of the vehicle by forming a shape gradually expanded from the bumper to the front thereof in an outer side of the bumper.

Still another aspect of the present application is directed to provide a structure for an exemplary external airbag vehicle including an airbag cushion disposed to develop toward a front side of a bumper from a folded state, a vent hole formed at the airbag cushion; and a variable vent cover attached to the airbag cushion to block the vent hole, wherein the variable vent cover comprises a material having a heat-resisting property which is melted and torn by a temperature and/or a pressure of an internal expansion gas of the airbag cushion on expansion of the airbag cushion.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 8 is a view explaining an operation of an exemplary variable vent cover according to the present application.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
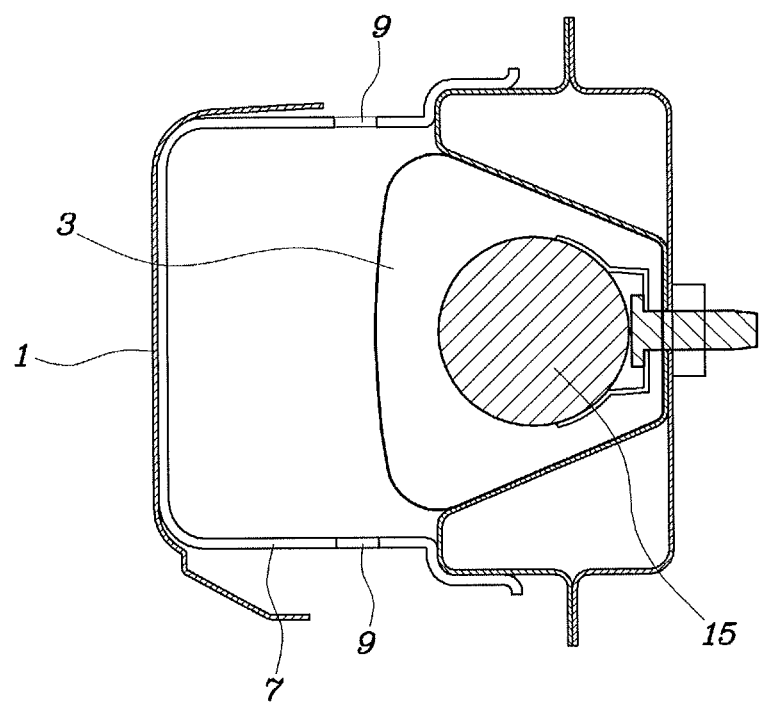
FIG. 1 is a view showing a first exemplary external airbag structure of a vehicle according to the present application.
Figure 2:
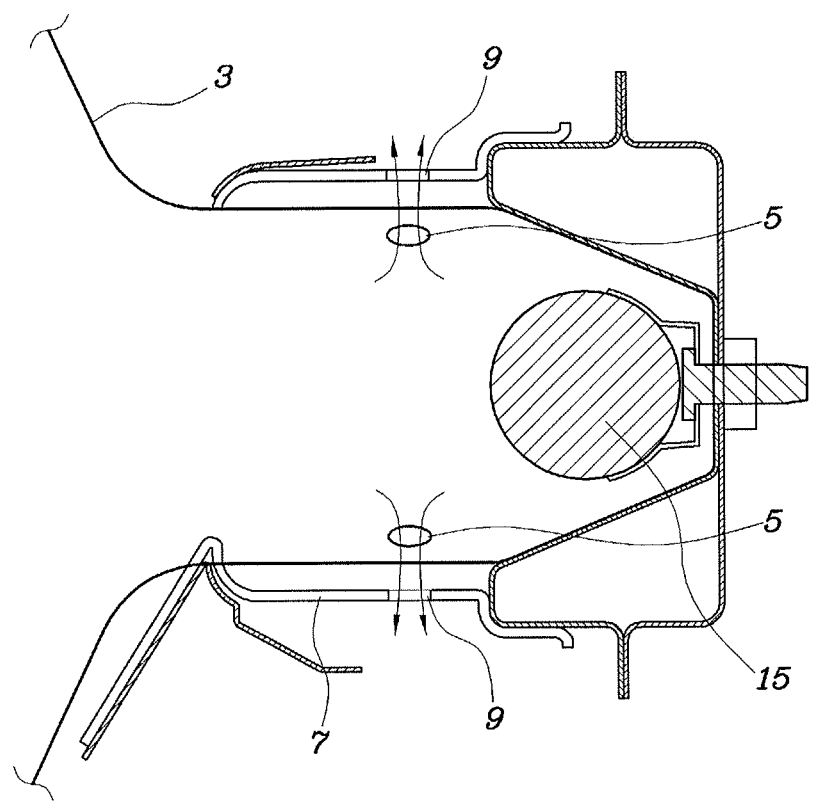
FIG. 2 is a view explaining a developed state of an exemplary airbag cushion of FIG. 1.
Figure 3:
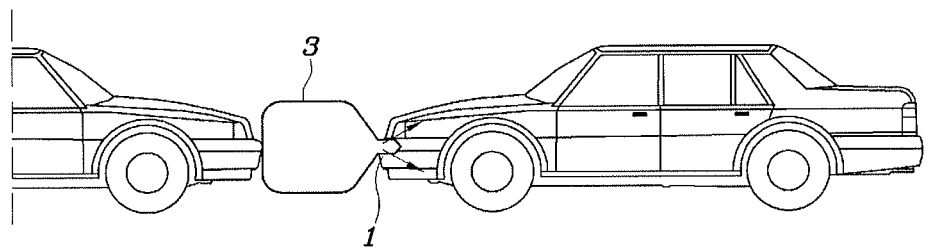
FIG. 3 is a view explaining an operation of an exemplary airbag cushion of FIG. 1.

Referring to FIGS. 1 to 3, a structure for an external airbag vehicle may include an airbag cushion 3 disposed to develop toward front side of a bumper 1 from a folded state within a bumper 1 by an action of a inflator 15; and a vent hole 5 formed in the airbag cushion 3 at a portion remained within the bumper 1 when the airbag cushion has been developed.

When a cushion action is performed after the airbag cushion 3 develops on a car crash, an expansion gas discharged from the airbag cushion is discharged into the bumper 1 by the vent hole 5 to protect a person or things adjacent to the vehicle as shown in FIG. 2.

Of course, the expansion gas discharged into the bumper 1 is discharged into the atmosphere from the bumper 1 at reduced pressure and temperature within the bumper.

For reference, FIGS. 1 to 2 show a developing guide 7 for guiding a developing direction of the airbag cushion 3 when the airbag cushion 3 develops from the folded airbag cushion 3 within bumper 1. In this case, a gas discharging vent port 9 communicating with the vent hole 5 is formed on the developing guide 7 at a position corresponding to a vent hole 5 of the airbag cushion so that the expansion gas discharged from the vent hole 5 is discharged into the bumper 1 through the gas discharging vent port 9.

Figure 7:
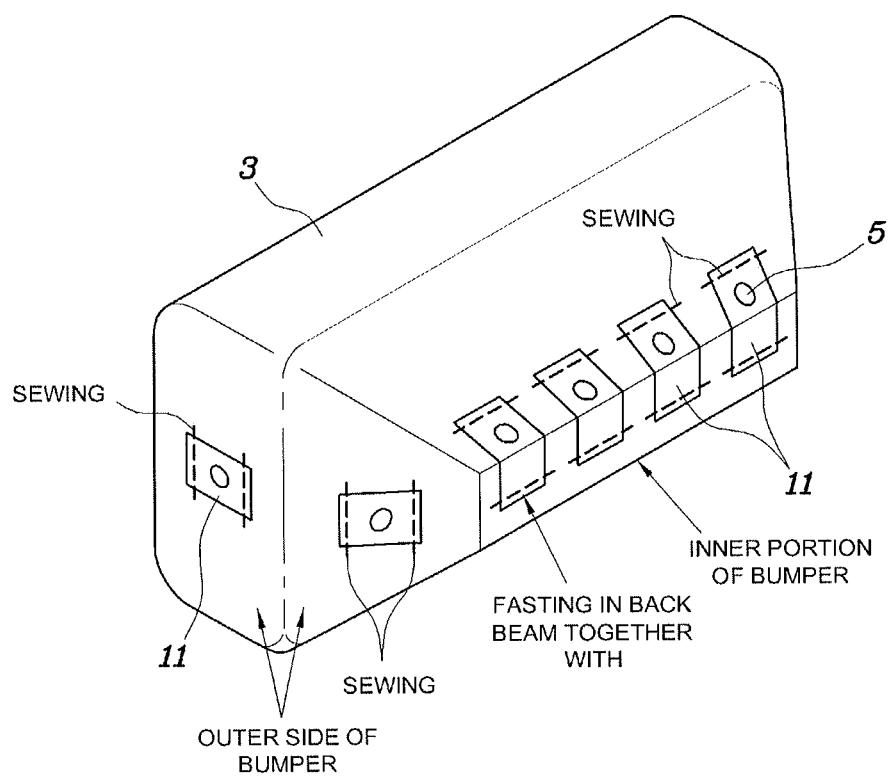
FIG. 7 is a view showing a third exemplary external airbag structure of a vehicle according to the present application.

Meanwhile, the vent hole 5 has the same or similar technical features as those discussed below. Further, the variable vent cover 11 is disposed at the airbag cushion to block the vent hole 5, as shown in FIG. 7. The variable vent cover 11 is made of a heat-resistant material, or comprises a heat-resistant material, which is melted and torn by an elevated pressure and/or an elevated temperature. Initially, the vent hole 5 is blocked by the variable vent cover 11 as the airbag cushion 3 develops just after a crush. This prevents the leakage of the expansion gas from the inflator 15 out of the vent hole 5, so that it is possible for the airbag cushion 3 to quickly develop even with a relatively small capacity of the inflator. Afterwards, when the airbag cushion 3 completely develops and needs the cushion action, the variable vent cover 11 is torn by the elevated pressure and/or elevated temperature of the internal expansion gas to obtain a smooth cushion action with a discharge of the expansion gas through the vent hole 5.

In various embodiments, the variable vent cover 11 wraps the vent hole 5 in an outer side of the airbag cushion 3 and is sewed onto the airbag cushion 3 on at least one edge thereof.

Figure 4:
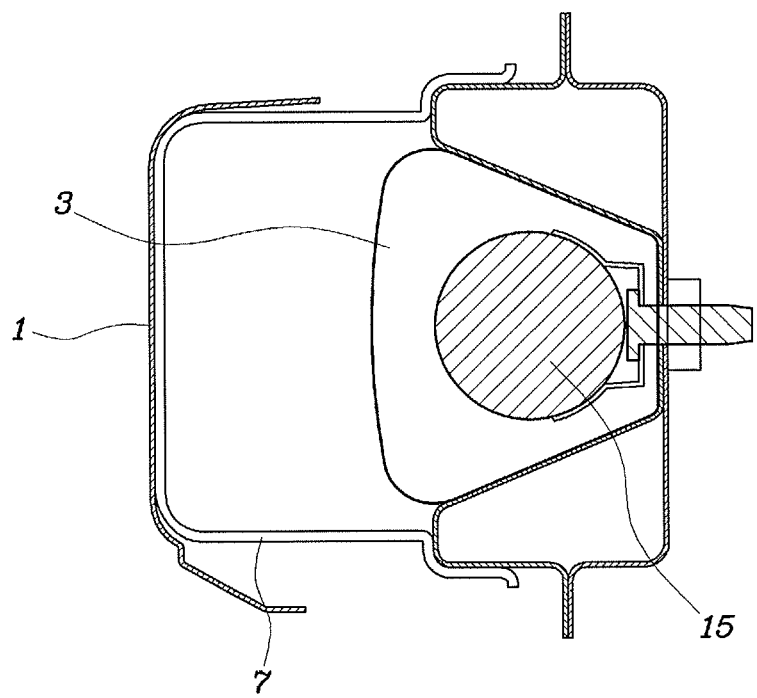
FIG. 4 is a view showing a second exemplary external airbag structure of a vehicle according to the present application.
Figure 5:
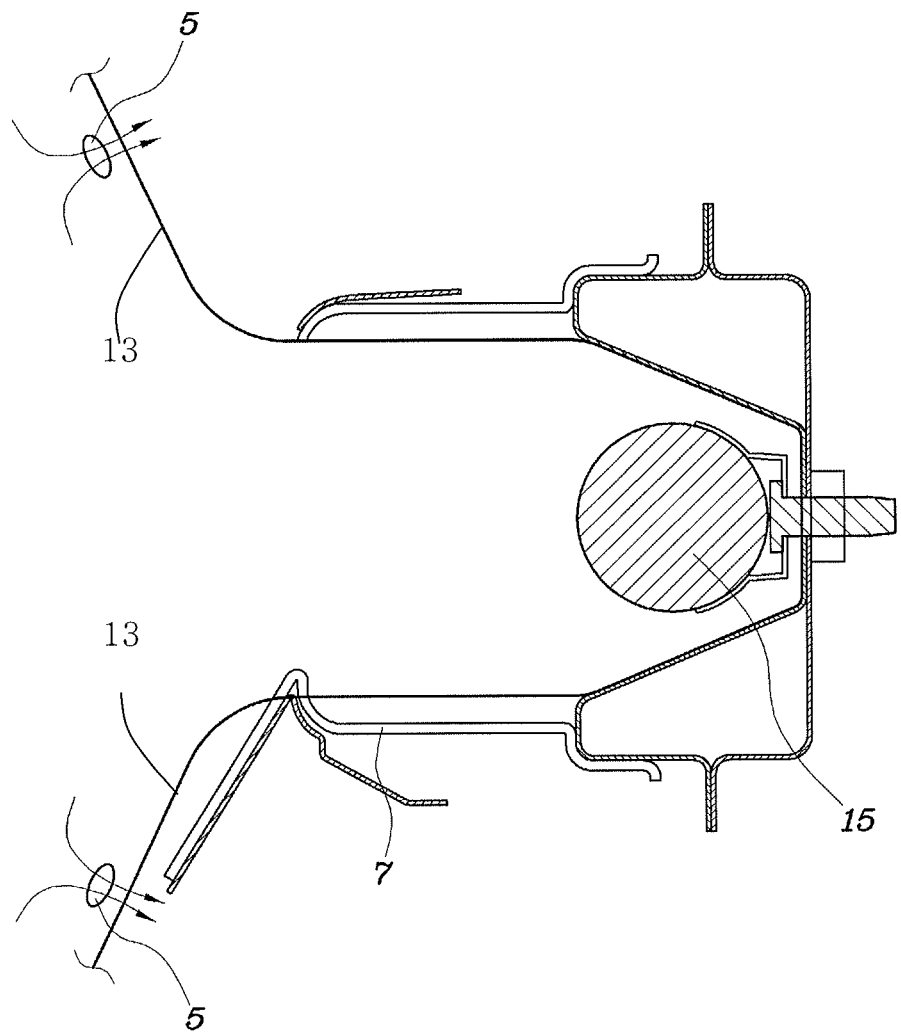
FIG. 5 is a view explaining a developed state of an exemplary airbag cushion of FIG. 4.
Figure 6:
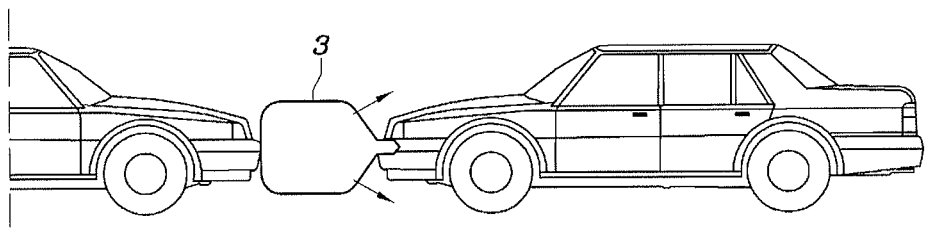
FIG. 6 is a view explaining an operation of an exemplary airbag cushion of FIG. 4.

Referring to FIGS. 4 to 6, the external airbag for a vehicle may include an airbag cushion 3 disposed to develop toward a front side of a bumper 1 from a folded state, and a vent hole 5 opened toward a rear side of a vehicle in a rear inclined surface 13 of the airbag cushion 3 directing to a rear of the vehicle by forming a shape gradually expanded from the bumper 1 to the front thereof in an outer side of the bumper 1 when the airbag cushion 3 has been developed.

That is, when the cushion action is performed after development of the airbag cushion, the expansion gas is discharged in a direction directing to a rear side of the vehicle as an expansion gas within the airbag cushion 3 is discharged through the vent hole 5 formed at a rear inclined surface 13 of the airbag cushion 3.

In various embodiments, the airbag cushion 3 may have a plurality of vent holes disposed on the rear inclined surface 13 substantially symmetrically above and below the bumper 1.

Meanwhile, the vent hole 5 has the same or similar technical features as that described below. Further, the variable vent cover 11 is disposed at the airbag cushion to block the vent hole 5, as shown in FIG. 7. The variable vent cover 11 is made of a heat-resistant material which is melted and torn by an elevated pressure and/or an elevated temperature. Initially, the vent hole 5 is blocked by the variable vent cover 11 as the airbag cushion 3 develops just after a crush. This prevents the leakage of the expansion gas from the inflator 15 out of the vent hole 5, so that it is possible for the airbag cushion 3 to quickly develop even with a relatively small capacity of the inflator. Afterwards, when the airbag cushion 3 completely develops and needs the cushion action, the variable vent cover 11 is torn by the elevated pressure and/or elevated temperature of the internal expansion gas to obtain a smooth cushion action with a discharge of the expansion gas through the vent hole 5.

FIG. 7 illustrates an exemplary structure of an external airbag of a vehicle according to the present application, which may include an airbag cushion 3 mounted to develop toward a front side of a bumper 1 from a folded state within the bumper 1, a vent hole 5 formed at the airbag cushion 3, and a variable vent cover 11 attached to the airbag cushion to initially block the vent hole 5.

The variable vent cover 11 is made of a heat-resistant material which is melted and torn by an elevated pressure and/or an elevated temperature. when the airbag cushion 3 completely develops and needs the cushion action, the variable vent cover 11 is torn by the elevated pressure and/or elevated temperature of the internal expansion gas of an internal expansion gas, as shown in FIG. 8. This opens up the vent hole 5 and enables a smooth cushion action with a discharge of the expansion gas through the vent hole 5.

In FIG. 7, the vent holes 5 and the variable vent covers 11 include both a portion placed at an inner side of the bumper 1 and a portion placed at an outer side thereof with the developed airbag cushion. Particularly, the variable vent covers 11 placed at the outer side of the bumper 1 are attached by the sewing and the variable vent covers 11 placed within bumper 1, are fixed on one side by the sewing and on the other side by fastening the airbag cushion 3 to a back beam within the bumper 1.

Of course, the airbag cushion 3 has a heat-resistant temperature that is higher than the maximum temperature of the internal expansion gas and the variable vent cover 11 is made of or comprises a material having a heat-resistant temperature that is lower than that of the airbag cushion 3.

Therefore, as shown in FIG. 8, the variable vent cover 11 blocks the vent hole 5 in early development to prevent the leakage of the airbag cushion 3 in the early development. This ensures that the development of an airbag cushion is quick. When the increasing temperature of the expansion gas within the airbag cushion on a crush is lower than the heat-resistant temperature of the airbag cushion 3 and is higher than the heat-resistant temperature of the variable vent cover 11, the variable vent cover 11 is melted and is torn by the internal pressure. This enables the vent hole 5 to open and perform the cushion action while discharging the expansion gas.

The present application takes effects that gas emitted from an airbag cushion of an external airbag does not exert an adverse effect on a person or things adjacent to the outside of vehicle, and opens a vent hole or a plurality of vent holes to perform an effective cushion action as the airbag cushion completes the development from a folded state thereof.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present application have been presented for purposes of illustration and description. They are not intended to be exhaustive or to limit the application to the precise forms disclosed, and obviously many modifications and variations are possible in light of the above teachings. The exemplary embodiments were chosen and described in order to explain certain principles of the application and their practical application, to thereby enable others skilled in the art to make and utilize various exemplary embodiments of the present application, as well as various alternatives and modifications thereof. It is intended that the scope of the application be defined by the Claims appended hereto and their equivalents.

What is claimed is:

1. An external airbag structure of a vehicle comprising:
    an airbag cushion disposed in the vehicle to develop toward a front side of a bumper from a folded state;
    a vent hole formed in the airbag cushion at a portion that is remained within the bumper when the airbag cushion is developed; and
    a developing guide fixing the bumper and the vehicle and receiving the airbag cushion therein to guide a developing direction of the airbag cushion when the airbag cushion develops from the folded state within the bumper.

2. The external airbag structure of a vehicle of claim 1, further comprising:
    a gas discharging port formed in the developing guide at a position corresponding to the vent hole of the airbag cushion for communicating with the vent hole.

3. The external airbag structure of a vehicle of claim 1, further comprising a variable vent cover to block the vent hole disposed at the airbag cushion, wherein the variable vent cover comprises a material having a heat-resisting property which is melted and torn by a temperature and/or a pressure of an internal expansion gas of the airbag cushion on expansion of the airbag cushion.

4. The external airbag structure of a vehicle of claim 3, wherein the variable vent cover wraps the vent hole in an outer side of the airbag cushion and is sewed onto the airbag cushion on at least one edge thereof.

* * * * *